United States Patent
Choi et al.

(10) Patent No.: US 8,165,421 B2
(45) Date of Patent: Apr. 24, 2012

(54) METHOD AND APPARATUS FOR IMAGE PROCESSING BY USING STORED IMAGE

(75) Inventors: Dong-bum Choi, Suwon-si (KR); Soo-young Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1043 days.

(21) Appl. No.: 12/046,084

(22) Filed: Mar. 11, 2008

(65) Prior Publication Data

US 2008/0279459 A1 Nov. 13, 2008

(30) Foreign Application Priority Data

May 7, 2007 (KR) ........................ 10-2007-0044227

(51) Int. Cl.
*G06K 9/40* (2006.01)
(52) U.S. Cl. ........ 382/275; 382/260; 382/274; 382/278; 358/3.26; 358/3.27; 358/463
(58) Field of Classification Search .................. 382/260, 382/274, 275, 278; 358/3.26, 3.27, 463
See application file for complete search history.

(56) References Cited

U.S. PATENT DOCUMENTS

| | | | | |
|---|---|---|---|---|
| 5,386,253 | A * | 1/1995 | Fielding | 348/745 |
| 5,867,152 | A * | 2/1999 | Sextro | 345/207 |
| 6,084,235 | A * | 7/2000 | Breithaupt et al. | 250/233 |
| 6,535,207 | B1 * | 3/2003 | Hiroki | 345/207 |
| 6,628,248 | B2 * | 9/2003 | Masumoto et al. | 345/32 |
| 7,076,086 | B2 * | 7/2006 | Miyake et al. | 382/112 |
| 7,079,687 | B2 * | 7/2006 | Guleryuz | 382/180 |
| 7,124,041 | B1 * | 10/2006 | Johnson et al. | 702/58 |
| 7,130,067 | B1 * | 10/2006 | Shibasaki | 358/1.15 |

* cited by examiner

*Primary Examiner* — Yosef Kassa
(74) *Attorney, Agent, or Firm* — Sughrue Mion, PLLC (57) ABSTRACT

Provided are a method and apparatus for correcting an image under conditions where degradation of an image occurs. The method includes receiving an input image; comparing the input image with a stored image related to the input image, according to a predetermined standard; and selectively correcting the input image based on the stored image according to the result of the comparison.

23 Claims, 8 Drawing Sheets

METHOD AND APPARATUS FOR IMAGE PROCESSING BY USING STORED IMAGE

CROSS-REFERENCE TO RELATED PATENT APPLICATION

This application claims priority from Korean Patent Application No. 10-2007-0044227 filed on May 7, 2007, in the Korean Intellectual Property Office, the disclosure of which is incorporated herein in its entirety by reference.

BACKGROUND OF THE INVENTION

1. Field of the Invention

The present invention relates to image processing, and more particularly, to a method and apparatus for correcting an image under circumstances where degradation of an image, such as due to low light-intensity occurs.

2. Description of the Related Art

As the number of users using digital image devices including a digital camcorder and a camera phone are rapidly increasing nowadays, the functions of digital image devices are becoming more diverse. In particular, a rapidly increasing demand for security requires image processing techniques for devices such as closed-circuit televisions (CCTVs), which are fixed at a particular location and take images of that location.

In devices installed at a fixed position for taking images of the same place, such as security cameras or CCTVs, it is possible to obtain data of decent quality without degradation when taking images during the day-time because there is enough light. However, when the images are taken at night-time, problems occur in the image such as appearance of noise or a decrease in dynamic range, due to lack of light.

As described above, when conventionally storing an image while a device, for example a security camera, is fixed, a light-intensity may repetitively change between adequate and inadequate. If the light-intensity is inadequate when taking an image, a lot of noise may be generated or degradation such as a decrease in dynamic range of luminance values of the image may occur. At this time, if a new object comes into a camera screen, it is difficult to distinguish the object from the background because of the degradation of the image. It is also difficult to identify the object because of the noise and the decrease in dynamic range.

SUMMARY OF THE INVENTION

The present invention provides a method and apparatus for image processing in devices capturing images of a fixed area or images having an object, such that an optimized image can be obtained by correcting an image captured under conditions where degradation of the image, such as due to low light-intensity, occurs, by using information from an image previously captured under optimum conditions.

According to an aspect of the present invention, there is provided a method of image processing, the method including receiving an input image; comparing the input image with a stored image related to the input image, according to a predetermined standard; and correcting the input image based on the stored image according to a result of the comparison.

According to an aspect of the present invention, the stored image related to the input image is a captured image of the same location as the input image.

According to an aspect of the present invention, the correcting of the input image corrects the input image based on the stored image when a quality of the input image is worse than a quality of the stored image based on the predetermined standard.

According to an aspect of the present invention, the correcting of the input image includes storing the input image when a quality of the input image is better than a quality of the stored image based on the predetermined standard.

According to an aspect of the present invention, the correcting of the input image removes noise of the input image based on the stored image.

According to an aspect of the present invention, the noise removal includes calculating a difference in light-intensity between the input image and the stored image; correcting light-intensity of the input image with light-intensity of the stored image, based on the calculated difference in light-intensity; and removing noise of the input image based on a difference in noise between the input image having light-intensity corrected and the stored image.

According to an aspect of the present invention, the correcting of the input image includes sensing an object in the input image based on the stored image.

According to an aspect of the present invention, the correcting of the input image includes rearranging the luminance value of the input image based on the stored image.

According to an aspect of the present invention, the comparing of the input image with a stored image according to a predetermined standard includes comparing average luminance values of the input image and the stored image.

According to an aspect of the present invention, the comparing of the input image with a stored image according to a predetermined standard includes comparing a number of pixels which exceed a maximum luminance value in the input image and in the stored image.

According to an aspect of the present invention, the comparing of the input image with a stored image according to a predetermined standard includes comparing a distribution of the luminance values of the input image and the stored image.

According to an aspect of the present invention, the method includes displaying of the corrected input image.

According to an aspect of the present invention, there is provided an apparatus for image processing, the apparatus including an input unit receiving an input image; a comparison unit comparing the input image with a stored image related to the input image according to a predetermined standard; and a correction unit correcting the input image based on the stored image according to a result of the comparison.

According to another aspect of the present invention, there is provided a computer readable medium having embodied thereon instructions for enabling a computer to execute a method of image processing, the method including: receiving an input image; comparing the input image with a stored image related to the input image, according to a predetermined standard; and correcting the input image based on the stored image according to a result of the comparison.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
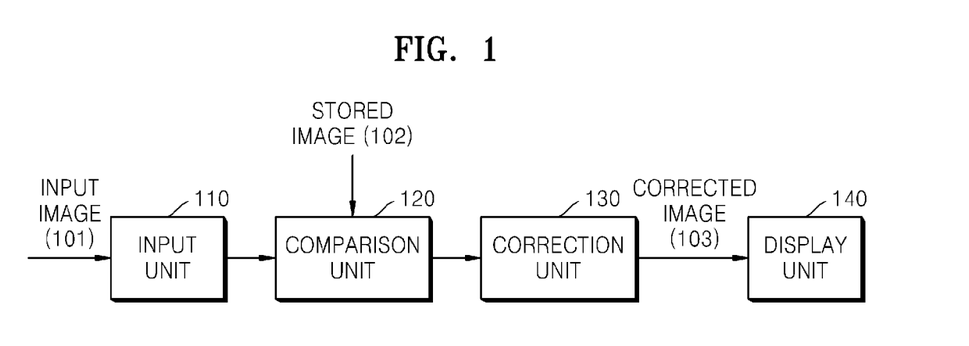
FIG. 1 is a block diagram of an image processing apparatus according to an exemplary embodiment of the present invention.

FIG. 1 is a block diagram of an image processing apparatus according to an exemplary embodiment of the present invention.

The image processing apparatus includes an input unit 110, a comparison unit 120, a correction unit 130, and a display unit 140.

The input unit 110 receives input image data. An input image 101 may be an image taken by an apparatus such as a camera or may be an image transmitted from a storage medium.

The comparison unit 120 compares the image input to the input unit 110 with a stored image 102 based on a predetermined standard. The stored image 102 is a captured image of the same location as the input image 101 and may be an optimal image determined based on the predetermined standard from among captured images of the same location.

In the present exemplary embodiment of the present invention, the input image 101 and the stored image 102 are compared based on the predetermined standard which includes various criteria such as an average luminance value, the number of pixels exceeding a maximum luminance value, and a variance of the luminance of pixels in the image. However, the comparison unit 120 compares a superiority of the quality of the input image 101 and the stored image 102, and therefore the criteria are not limited to the above listed criteria.

The correction unit 130 corrects the input image 101 based on the stored image 102 according to the result from the comparison unit 120.

According to the result from the comparison unit 120, if the input image 101 is determined to have a quality that is worse than a quality of the stored image 102, the correction unit 130 corrects the input image 101 based on the stored image 102. On the other hand, if the input image 101 is determined to have a quality that is better than the quality of the stored image 102, the input image 101 is stored without a correction. Thus, the stored image 102 can be replaced with the input image 101 which has a better quality.

In the present exemplary embodiment of the present invention, the quality of an image is better that has a higher average luminance value, a smaller number of pixels exceeding the maximum luminance value, i.e., a smaller number of saturated pixels, and a greater variance of the luminance of pixels in the image.

The display unit 140 displays the input image 101. If the image input according to the result of the comparison unit 120 is corrected in the correction unit 130, the corrected image 103 is then displayed and if the input image is not corrected in the correction unit 130, the input image 101 is then displayed without a correction.

The display unit 140 is not always necessary for executing the present invention and the present invention may be executed without the display unit 140 according to another exemplary embodiment.

Figure 2A:
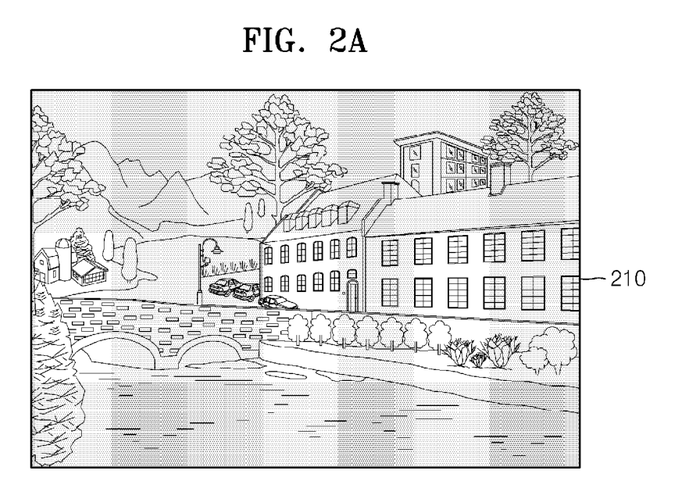
FIGS. 2A and 2C illustrate exemplary images taken at an exemplary light level and FIGS. 2B and 2D illustrate histograms of their luminance values.
Figure 2B:
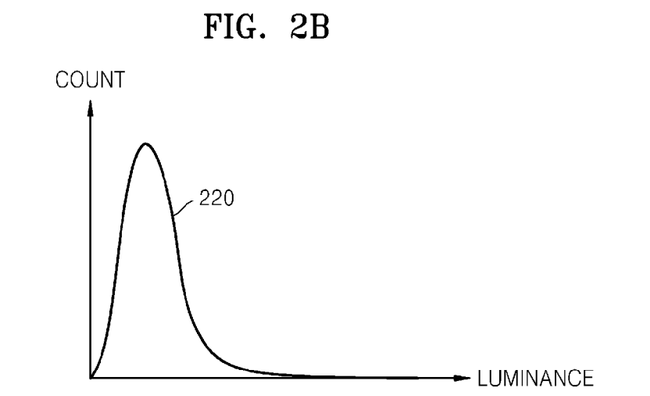

FIGS. 2A and 2B are respectively, an input image taken at a low light-intensity 210 and a histogram 220.

The image 210 is an image taken at a low light-intensity, i.e., when the amount of light is inadequate. The histogram 220 is a graph showing the number of pixels in the image that correspond to a particular luminance value.

The input image taken at a low light-intensity 210 mostly appears dark because of a lack of light. In other words, the luminance value of the image is low in general. Thus, the histogram 220 is biased towards the left.

Figure 2C:
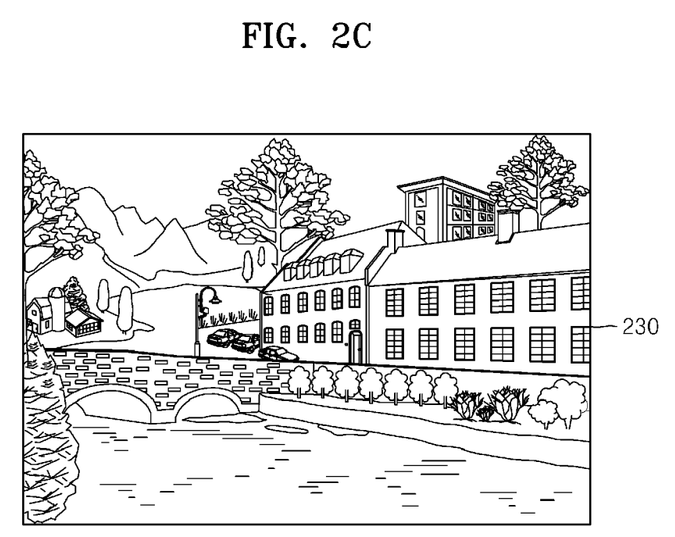
Figure 2D:
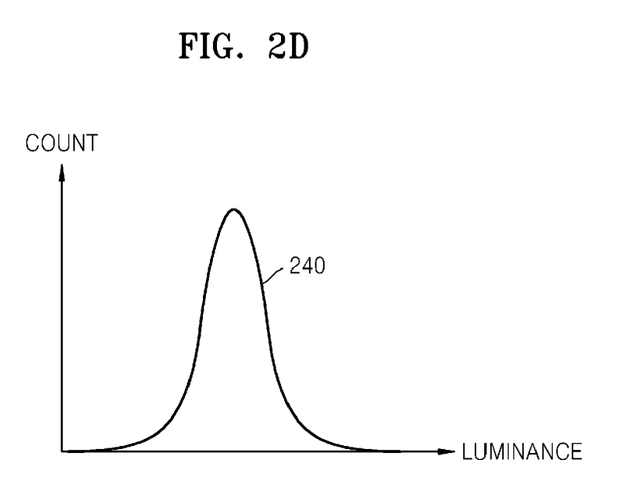

FIGS. 2C and 2D are respectively examples of an input image taken at a high light-intensity 230 and a histogram 240.

The high light-intensity is when the amount of light is adequate. The luminance value of the image varies more because of adequate light. Thus, the histogram 240 is widely spread over all luminance values.

In an exemplary embodiment of the present invention, the comparison unit 120 calculates average luminance values of the input image 210 and the stored image 230. The average luminance value of the stored image 230 is greater than the average luminance value of the input image 210 because the stored image 230 was taken when the amount of light was adequate compared to the input image 210. Thus, the quality of the stored image 230 is better than the input image 210, and so the input image 210 is corrected by the correction unit 130.

Figure 3A:
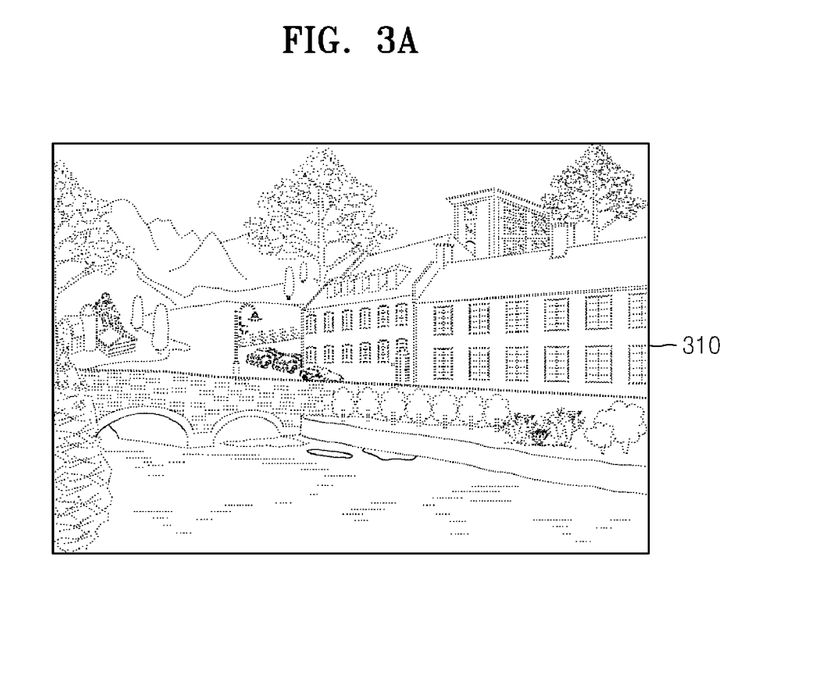
FIGS. 3A and 3C illustrate other exemplary images taken at an exemplary light level and FIGS. 3B and 3D illustrate histograms of their luminance values.
Figure 3B:
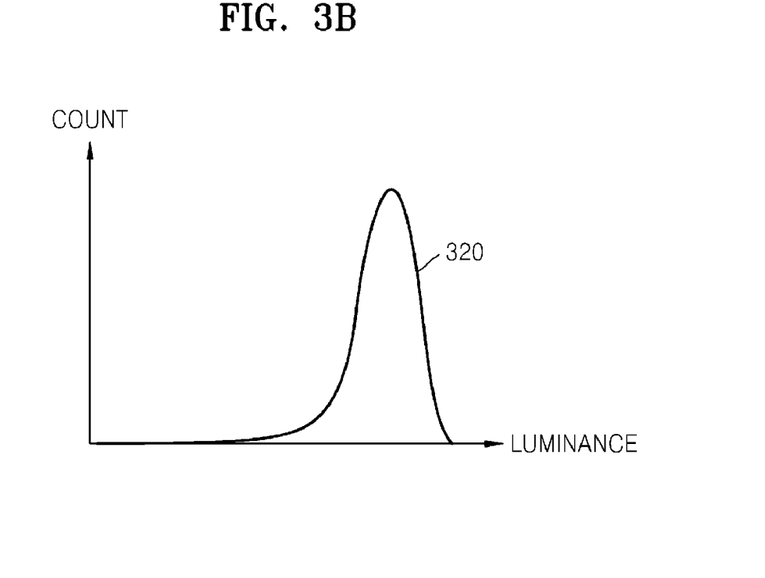

FIGS. 3A and 3B are respectively examples of a stored image taken at a very high light-intensity 310 and a histogram 320.

The image taken at a very high light-intensity 310 appears bright overall. In other words, a luminance value of the image is high in general. Here, the histogram 320 is biased towards the right. In this case, a maximum luminance value is 255 when expressing luminance information in 8-bit format. Thus, values exceeding the maximum luminance value are represented as 255. When a luminance value of a particular pixel is equal to or greater than the maximum luminance value, saturation occurs.

The image taken at a very high light-intensity 310 contains a plurality of pixels having saturated luminance.

Figure 3C:
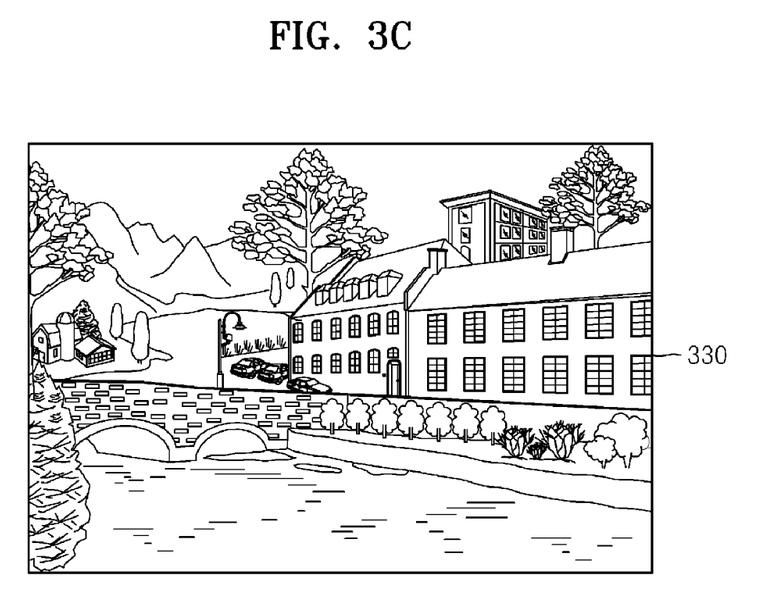
Figure 3D:
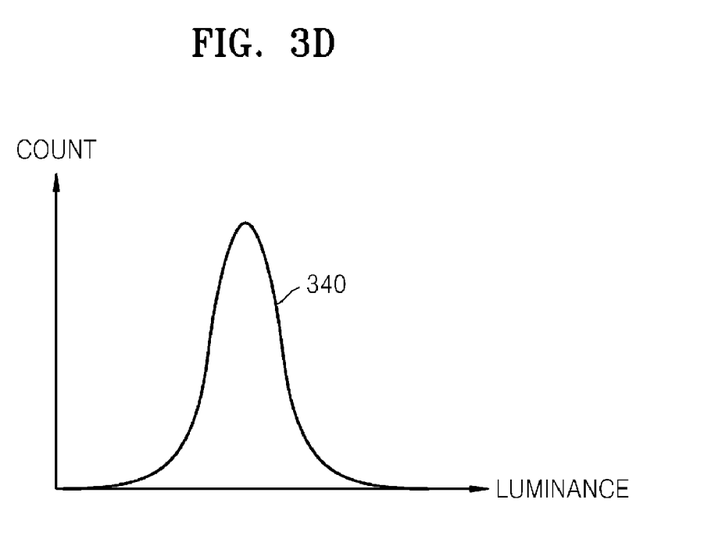

FIGS. 3C and 3D are respectively examples of a stored image taken at a high light-intensity 330 and a histogram 340.

The image taken at the high light-intensity 330 has enough light but not too much, therefore pixels have various luminance values in the image. Accordingly, the histogram is widely spread over luminance values. Thus, the number of pixels having saturated luminance is small.

In an embodiment of the present invention, the comparison unit 120 calculates the number of pixels having saturated luminance in the input image 310 and the stored image 330. It is determined that the quality of the stored image 330 is better than the quality of the input image 310 because the number of pixels having saturated luminance in the stored image 330 is smaller than in the input image 310. Accordingly, the input image 310 is corrected by the correction unit 130.

Figure 4A:
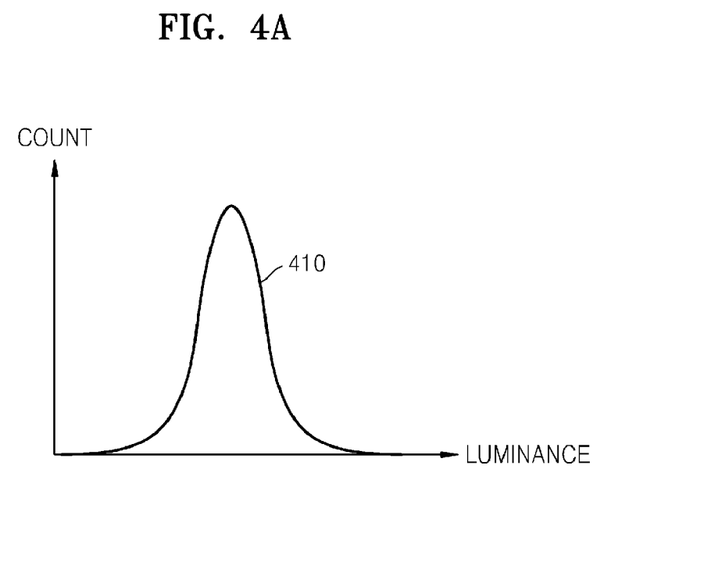
FIGS. 4A and 4B illustrate exemplary distributions of luminance values of exemplary images.

FIG. 4A illustrates, for example, a histogram of an input image 410 having a small variance of the luminance value.

Figure 4B:
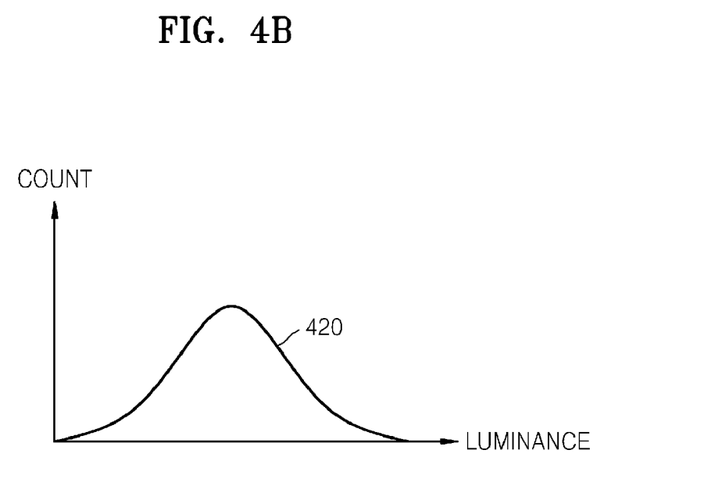

FIG. 4B illustrates, for example, a histogram of a stored image 420 having a large variance of the luminance value.

In an exemplary embodiment of the present invention, the comparison unit 120 calculates variance of the luminance values of pixels in the input image 410 and luminance distribution values of the stored image 420. When the variance of the luminance values of pixels is large, luminance values of pixels of an image are widely spread over a majority of luminance values, and therefore the quality of an image having a large variance of the luminance values of pixels is better than the quality of an image having a small variance of the luminance values of pixels. Accordingly, it is determined that the quality of the stored image 420 is better than that of the input image 410 since the variance of the luminance value of the stored image 420 is larger than the variance of the luminance value of the input image 410. Thus, the input image 410 is corrected by the correction unit 130.

The comparison unit 120 may compare an input image with a stored image based on any one of the standards illustrated in FIGS. 2A through 4B, and may compare an input image with a stored image by applying a plurality of standards simultaneously.

Figure 5:
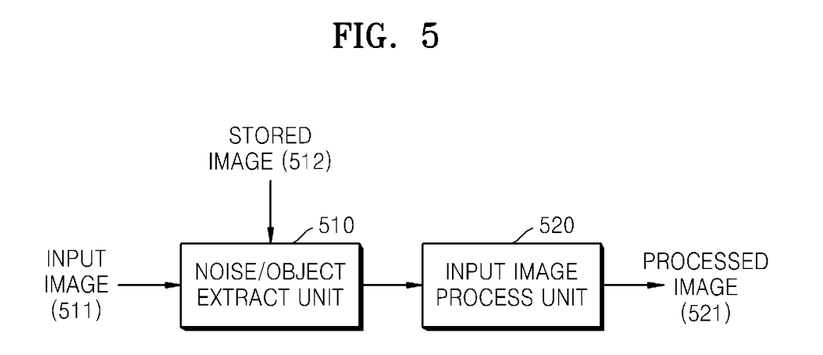
FIG. 5 illustrates a correction unit in the image processing apparatus according to an exemplary embodiment of the present invention.

FIG. 5 illustrates a correction unit in the image processing apparatus according to an exemplary embodiment of the present invention.

The correction unit in the image processing apparatus according to the present exemplary embodiment includes a noise/object extraction unit 510 and an input image processing unit 520.

The noise/object extraction unit 510 extracts noise or an object from an input image 511 based on a stored image 512. The noise/object extraction unit 510 can be embodied in various forms. For example, an average luminance value of the input image 511 is corrected by an average luminance value of the stored image 512, and noise or an object can be then extracted by using a difference between the stored image 512 and the input image having the average luminance value corrected. Detailed explanations will be given later with reference to FIG. 6.

The input image processing unit 520 processes the input image based on the extracted noise/object. The input image processing unit 520 can be embodied in various forms.

As an example, the input image processing unit 520 analyzes the noise extracted by the noise/object extraction unit 510. A variance of noise value is calculated based on the analyzed noise, and then the noise is removed by filtering the image through an appropriate filter.

The input image processing unit 520 can be designed to process the input image using information transmitted from the noise/object extraction unit 510 and to output the processed image 521.

Figure 6:
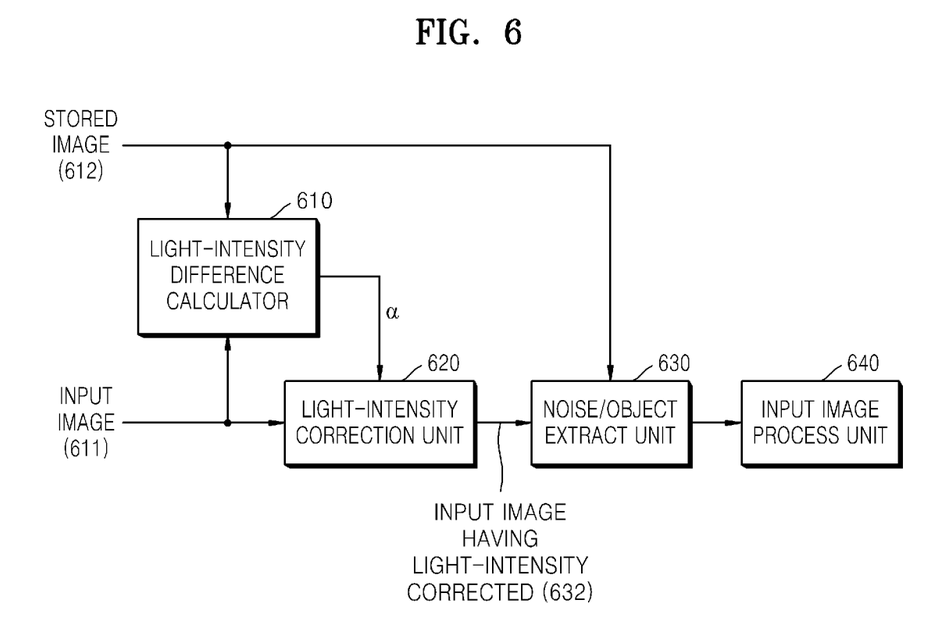
FIG. 6 illustrates a correction unit in the image processing apparatus according to an exemplary embodiment of the present invention.

FIG. 6 illustrates a correction unit in the image processing apparatus according to an exemplary embodiment of the present invention.

The correction unit in the image processing apparatus includes a light-intensity difference calculator 610, a light-intensity correction unit 620, a noise/object extraction unit 630, and an input image processing unit 640.

The light-intensity difference calculator 610 calculates a light-intensity difference between the input image 611 and the stored image 612. One method of calculating the light-intensity difference is by calculating average luminance values of the input image 611 and the stored image 612 and then calculating the light-intensity difference based on the difference of average luminance values.

The light-intensity correction unit 620 adjusts a light-intensity of the input image with a light-intensity of the stored image based on the light-intensity difference between the stored image 612 and the input image 611 calculated by the light-intensity difference calculator 610. One method of adjusting the light-intensity is by multiplying a luminance value of the input image 611 by the light-intensity difference calculated by the light-intensity difference calculator 610. In this case, the average luminance value of the input image 611 is made equal to the average luminance value of the stored image 612, and thereby a light-intensity of the input image 611 is corrected.

The noise/object extraction unit 630 extracts noise and an object by using the stored image 612 and the input image having light-intensity corrected 632. For example, extraction may be performed by calculating a difference between the stored image 612 and the input image having light-intensity corrected 632. The shape of a histogram of the input image having light-intensity corrected 632, i.e., the distribution of the luminance values of pixels in the input image having light-intensity corrected 632, resembles a shape of the histogram of the stored image 612. Therefore, noise information can be extracted by calculating a difference of the luminance values of the stored image 612 and the input image having light-intensity corrected 632. However, a method of extracting noise and an object is not limited to just this method.

The input image processing unit 640 processes the input image having light-intensity corrected 632 based on the information extracted by the noise/object extraction unit 630. In an exemplary scenario, the input image processing unit 640 can also process the input image 611 before its light-intensity is corrected.

The input image processing unit 640 removes noise or rearranges luminance values of the input image having light-intensity corrected 632 or the input image 611 before its light-intensity is corrected.

As an example of removing the noise, removal is performed by calculating the difference between noise in the image having light-intensity corrected 632 and noise extracted by the noise/object extraction unit 630. Another example of removing the noise includes filtering the image through a filter, such as a low pass filter (LPF), by using noise information extracted by the noise/object extraction unit 630.

When rearranging a luminance value, luminance values of the stored image 612 and the input image having light-intensity corrected 632 are calculated first by comparing luminance values of objects existing in both images 612 and 632. A luminance value of a new object existing in the input image having light-intensity corrected 632 is extracted by the noise/object extraction unit 630, based on the rearranged luminance value.

The input image processing unit 640 can be embodied in various forms and is not limited to the embodiments set forth herein.

Figure 7:
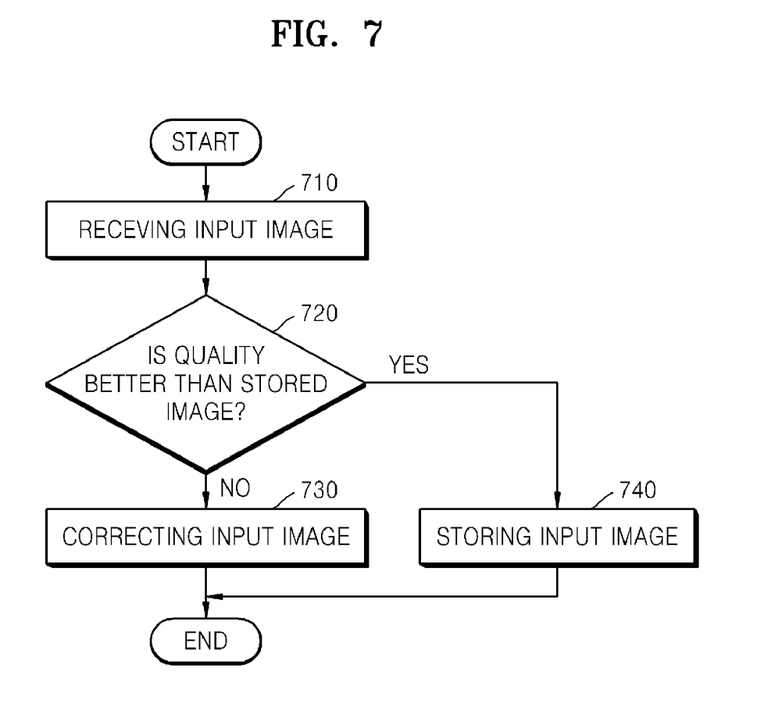
FIG. 7 is a flowchart of a method of image processing according to the an exemplary embodiment of the present invention.

FIG. 7 is a flowchart of a method of image processing according to an embodiment of the present invention.

In operation 710, an input image is received.

The input image may be a captured image or a transmitted image.

In operation 720, the input image and a stored image are compared according to a predetermined standard.

The stored image may be an image determined as an optimal image based on the predetermined standard from amongst the input image and a captured image of the same location as the input image. The predetermined standard determines a superiority of a quality of an image. The input image and the stored image are compared based on the predetermined standard, and if it is determined that the quality of the input image is better than that of the stored image, operation 740 is performed, and if it is determined that the quality of the input image is worse than that of the stored image, operation 730 is performed.

In operation 730, the input image is corrected based on the stored image.

In operation 740, the stored image is replaced by storing the input image.

Figure 8:
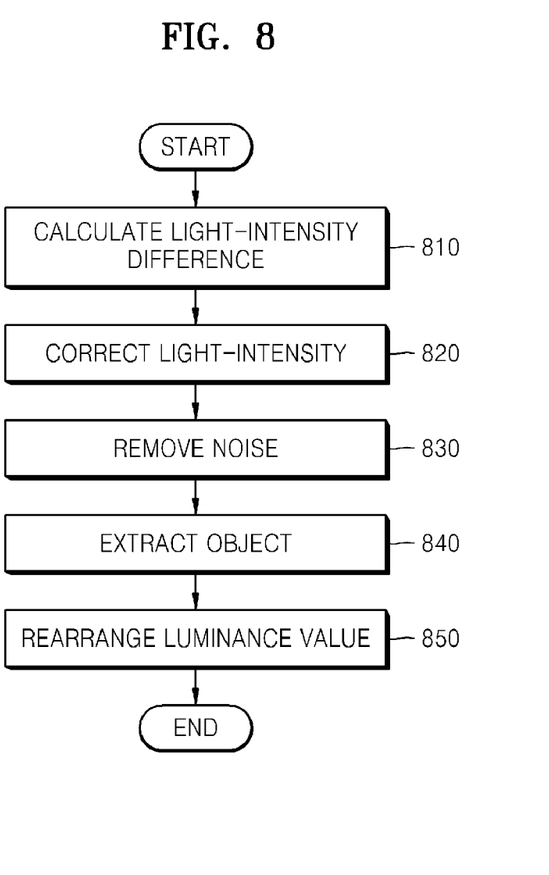
FIG. 8 is a flowchart of a method of image processing according to another exemplary embodiment of the present invention.

FIG. 8 is a flowchart of a method of image processing according to an exemplary implementation of the present invention.

In operation 810, a light-intensity difference between the input image and the stored image is calculated by using average luminance values of the input image and the stored image.

In operation 820, the light-intensity of the input image is corrected by using the calculated light-intensity difference. For example, an image having the same light-intensity as the stored image is obtained by multiplying a luminance value of the input image by the calculated light-intensity difference. However, a problem wherein the noise increases may occur in this case.

In operation 830, noise removal is performed. The amount of noise in the stored image is very small compared to the input image or the input image having light-intensity corrected, since it was taken under conditions where light was adequate. Thus, characteristics of the noise are analyzed by using a difference between the stored image and the input image having light-intensity corrected. Then, the noise is removed by using a method, such as filtering the input image having light-intensity corrected through a filter, based on the analyzed characteristics of the noise.

In operation 840, extracting of an object is performed.

If the input image was taken at low light-intensity, a distribution range of luminance values, in other words a dynamic range, in the image is narrow and noise may appear. At this time, if a new object comes onto a screen, it is difficult to distinguish the object from the background because of a degradation of the image.

On the other hand, the stored image has clearer image information on the same background as the input image except for a part where the object is, compared to the input image, because the stored image was taken at high light-intensity at the same location as the input image. Thus, the object can be extracted by comparing the stored image and the input image having the light-intensity corrected.

In operation 850, a luminance value of the input image is rearranged.

A range of luminance of an image in a histogram is called a dynamic range. A dynamic range of an image taken at low light-intensity or very high light-intensity is very narrow. In this case, adjacent brightness levels appear similar and therefore boundaries between a background and another background in the image or a background and an object are not clear.

The stored image is an image taken at high light-intensity and a dynamic range is widely spread over almost all luminance values. Thus, in the same background as the input image, a luminance value of the input image can be rearranged referring to the stored image. A luminance value of a new object in the input image can be rearranged by using the rearranged information in the same background.

Although all operations 830 through 850, which are operations of noise removal, object extraction, and luminance value rearrangement, were performed on the input image in an embodiment of the present invention, any of operations 830 through 850 can be individually performed on the input image according to embodiments of the present invention. The noise removal, object extraction, and luminance value rearrangement explained herein are exemplary embodiments only and can be performed in various ways.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

As described above, it is possible to obtain an optimal image by correcting an image under conditions where degradation of an image, such as due to low light-intensity, occurs, by using information in an image captured under optimal conditions.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of image processing, the method comprising:
receiving an input image;
comparing the input image with a stored image, according to a predetermined standard, the stored image being an image of the same location as the input image and being an optimal image determined based on the predetermined standard from among captured images of the same location; and
correcting the input image based on the stored image based on a result of the comparison.

2. The method of claim 1, wherein the correcting of the input image occurs in response to a quality of the input image being worse than a quality of the stored image based on the predetermined standard.

3. The method of claim 1, wherein the correcting of the input image comprises storing the input image when a quality of the input image is better than a quality of the stored image based on the predetermined standard.

4. The method of claim 1, wherein the correcting of the input image includes removing noise in the input image based on the stored image.

5. The method of claim 4, wherein the removing of noise comprises:
calculating a difference in light-intensity between the input image and the stored image;
correcting light-intensity of the input image, based on the calculated difference in light-intensity; and
removing noise of the input image having light-intensity corrected based on a difference of the luminance values of pixels between in the input image having light-intensity corrected and in the stored image.

6. The method of claim 1, wherein the correcting of the input image comprises sensing an object in the input image based on the stored image.

7. The method of claim 1, wherein the correcting of the input image comprises rearranging a luminance value of the input image based on the stored image.

8. The method of claim 1, wherein the comparing of the input image with the stored image according to a predetermined standard comprises comparing average luminance values of the input image and the stored image.

9. The method of claim 1, wherein the comparing of the input image with a stored image according to a predetermined standard comprises comparing a number of pixels which exceed a maximum luminance value in the input image and in the stored image.

10. The method of claim 1, wherein the comparing of the input image with a stored image according to a predetermined standard comprises comparing a variance of the luminance values of pixels in the input image and the stored image.

11. The method of claim 1, further comprising displaying of the corrected input image.

12. An apparatus for image processing, the apparatus comprising:
 an input unit which receives an input image;
 a comparison unit which compares the input image with a stored image according to a predetermined standard, the stored imaged being an image of the same location as the input image and being an optimal image determined based on the predetermined standard from among captured images of the same location; and
 a correction unit which corrects the input image based on the stored image based on a result of the comparison.

13. The apparatus of claim 12, wherein the correction unit corrects the input image in response to a quality of the input image being worse than a quality of the stored image based on the predetermined standard.

14. The apparatus of claim 12, wherein the correcting of the input image comprises storing the input image when a quality of the input image is better than a quality of the stored image based on the predetermined standard.

15. The apparatus of claim 12, wherein the correction unit removes noise of the input image based on the stored image.

16. The apparatus of claim 15, wherein the correction unit comprises:
 a light-intensity calculator which calculates a difference in light-intensity between the input image and the stored image;
 a light-intensity correction unit which corrects light-intensity of the input image, based on the calculated difference in light-intensity; and
 a noise removal unit which removes noise of the input image having light-intensity corrected based on a difference of the luminance values of pixels between in the input image having light-intensity corrected and in the stored image.

17. The apparatus of claim 12, wherein the correction unit senses an object in the input image based on the stored image.

18. The apparatus of claim 12, wherein the correction unit rearranges the luminance value of the input image based on the stored image.

19. The apparatus of claim 12, wherein the comparison unit compares average luminance values of the input image and the stored image.

20. The apparatus of claim 12, wherein the comparison unit compares a number of pixels which exceed a maximum luminance value in the input image and in the stored image.

21. The apparatus of claim 12, wherein the comparison unit compares a variance of the luminance values of pixels in the input image and the stored image.

22. The apparatus of claim 12, further comprising of a display unit which displays the corrected input image.

23. A non-transitory computer readable medium having embodied thereon instructions for enabling a computer to execute a method comprising:
 receiving an input image;
 comparing the input image with a stored image, according to a predetermined standard, the stored image being an image of the same location as the input image and being an optimal image determined based on the predetermined standard from among captured images of the same location; and
 correcting the input image based on the stored image based on a result of the comparison.

* * * * *